Jan. 9, 1934.　　　　D. J. JONES　　　　1,942,896

ICE CREAM CONE

Filed June 20, 1932

INVENTOR.
DAVID J. JONES.
BY
ATTORNEY.

Patented Jan. 9, 1934

1,942,896

UNITED STATES PATENT OFFICE 1,942,896

ICE CREAM CONE

David J. Jones, Binghamton, N. Y., assignor to MacElhone Methods, Inc., Binghamton, N. Y., a corporation of New York Application June 20, 1932. Serial No. 618,279

4 Claims. (Cl. 99—11)

My invention relates to an improvement in ice cream cones and has for its primary object the provision of an auxiliary supporting means for the ice cream or other frozen serving within the ordinary cake cone.

In the use of the conventional cake cone, the ice cream or other frozen confection to be placed therein, depends for its support upon the side walls of the cake cone. With a wide variety in shapes of the servings and the sizes of the small ends thereof, these servings vary in the depth at which they extend down into the cone. By my invention I have provided a means whereby the servings will be supported within the cone independent of the side wall thereof and at a uniform distance from the open end of the cone.

A further and important object of my invention lies in the provision of such a support which in addition holds the ice cream serving against accidental or inadvertent displacement through tipping of the cone away from normal vertical position.

Other objects and advantages will be apparent as the description proceeds, reference now being had to the figures of the accompanying drawing forming a part of this application and wherein like reference numerals indicate like parts.

Figure 1:
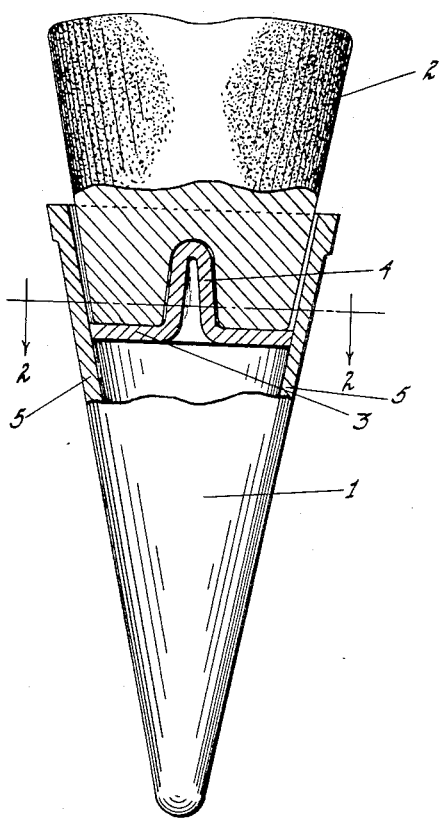
Figure 1 is a side view of a conventional ice cream cone provided with my invention and with an ice cream serving in position therein, certain parts being in section for clearness.
Figure 2:
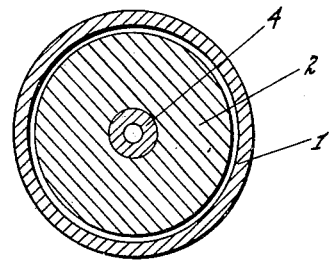
Figure 2 is a detail sectional view taken on the line 2—2 of Figure 1.
Figure 3:
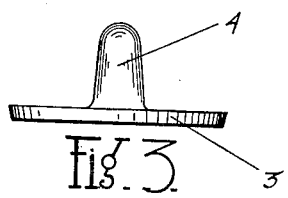
Figure 3 is a detail side view of my improved auxiliary supporting member.
Figure 4:
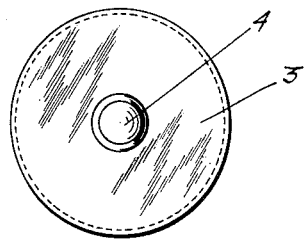
Figure 4 is a detail top plan view thereof.

It will be understood, of course, that in referring to "ice cream", "frozen serving" or the like, I intend to cover all similar frozen confections such as water ices, sherbets, frozen custard, or the like.

The reference character 1 refers generally to a cake cone of the conventional type adapted to receive a serving 2 of ice cream or other frozen confection, which may be individually formed or molded or which may be dipped.

Adapted for disposition within the cone 1 is a supporting member 3 provided centrally with an upstanding holding portion 4. This supporting member 3 may be of the same material as the cake cone 1 or may be of other desired edible material and of any desired flavor. The supporting member 3 is preferably circular in shape and of a size to engage with the inner surface of the side walls 5 of the cone 1 whereby the supporting member is rigidly fixed in position.

The frozen serving 2 is adapted to be placed in the cone 1 and engages at its lower end and is supported by the supporting member 3. The lower end of this serving 2 may be pre-formed with a recess adapted to receive the upstanding portion 4 of the supporting member 3 or if the ice cream material is soft, the same will receive the upstanding portion 4 as the serving is pressed down into the cone. Thus the ice cream serving 2 is supported independently of the side walls of the cone and holds it a uniform distance downwardly in the cone. The upstanding portion 4, of course, prevents accidental displacement or dropping of the serving out of the cone if it should be tipped from its normal vertical position.

Figure 5:
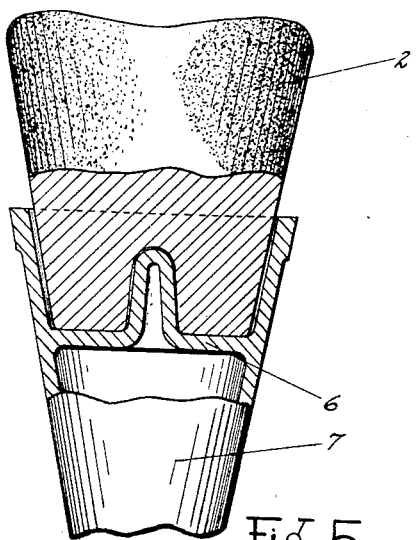
Figure 5 is a detail view partly in section illustrating a slightly modified form of my invention.

The diameter of the supporting member 3 should, of course, be uniform in the making of these supporting members so as to always engage with the cone at a uniform distance below the top. Figure 5 shows a modification of the invention in which the auxiliary supporting member 6 is molded, baked, or otherwse formed integral with the side walls of the cone 7.

Of course, changes may be made in details without departing from the spirit and scope of my invention. I do not limit myself, therefore, to the exact form herein shown and described, other than by the appended claims.

I claim:

1. An edible substantially cone shaped holder for a frozen confection having an open end and supporting means for said confection in said holder intermediate its ends, said supporting means having an upwardly extending portion centrally thereof.

2. An edible holder for a frozen confection comprising a substantially cone shaped member having an open end and supporting means for said confection in said holder intermediate its ends and engaging the side walls thereof, said supporting means having an upward extending portion centrally thereof.

3. In combination, an edible holder comprising a substantially cone shaped member having an open end, supporting means in said holder intermediate its ends and having a portion extending upwardly, a frozen confection on said supporting means and engaging said upstanding portion.

4. In combination, an edible holder comprising a substantially cone shaped member having an open end, supporting means in said holder intermediate its end and having a portion extending upwardly, and a frozen confection on said supporting means having a recess in its lower end for receiving said upstanding portion.

DAVID J. JONES.